United States Patent
Gibbs et al.

(10) Patent No.: US 7,136,945 B2
(45) Date of Patent: Nov. 14, 2006

(54) METHOD AND APPARATUS FOR EXTENDING PROTECTED CONTENT ACCESS WITH PEER TO PEER APPLICATIONS

(75) Inventors: Simon Gibbs, San Jose, CA (US); Michael Hoch, San Jose, CA (US); Ravi Gauba, Fremont, CA (US); Jeff Liu, Fremont, CA (US); Sidney Wang, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 166 days.

(21) Appl. No.: 10/403,616

(22) Filed: Mar. 31, 2003

(65) Prior Publication Data
US 2004/0193680 A1 Sep. 30, 2004

(51) Int. Cl.
G06F 13/00 (2006.01)
G06F 15/16 (2006.01)
G06Q 90/00 (2006.01)

(52) U.S. Cl. ............................ 710/62; 705/51; 705/59; 709/203

(58) Field of Classification Search ................ 719/311, 719/313, 315–318, 328, 329; 709/201–205; 710/62–64, 72; 715/751–759; 705/51–54, 705/57, 59
See application file for complete search history.

(56) References Cited
U.S. PATENT DOCUMENTS

2002/0069420 A1* 6/2002 Russell et al. .............. 725/92
2002/0152393 A1* 10/2002 Thoma et al. .............. 713/189
2004/0003139 A1* 1/2004 Cottrille et al. ............ 709/331
2004/0024846 A1* 2/2004 Randall et al. ............. 709/219
2004/0034860 A1* 2/2004 Fernando et al. .......... 719/315
2004/0181487 A1* 9/2004 Hanson ...................... 705/52
2004/0249768 A1* 12/2004 Kontio et al. ............... 705/65

* cited by examiner

Primary Examiner—Ilwoo Park
(74) Attorney, Agent, or Firm—John P. O'Banion

(57) ABSTRACT

The invention illustrates a system and method of sharing content with multiple peer device while protecting the content from unauthorized use. In one embodiment, the system and method comprises: identifying a plurality of peer devices within a predetermined area wherein each of the plurality of peer devices includes an interface framework; directly transmitting content among the plurality of devices; and a selected plurality of peer devices requesting a license from a digital rights management server for the content, wherein the selected plurality of peer devices possess the content, wherein the interface framework is configured to allow the plurality of peer devices to directly communicate and utilize an application Other aspects and advantages of the invention will become apparent from the following detailed description, taken in conjunction with the accompanying drawings, illustrated by way of example of the principles of the invention.

25 Claims, 12 Drawing Sheets

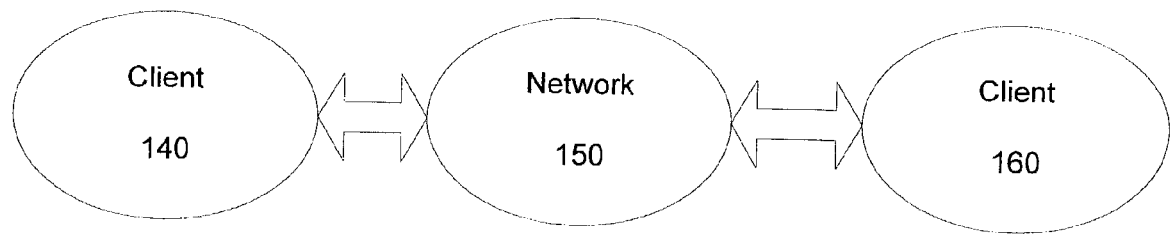
Figure
1B

METHOD AND APPARATUS FOR EXTENDING PROTECTED CONTENT ACCESS WITH PEER TO PEER APPLICATIONS

FIELD OF THE INVENTION

The present invention relates generally to providing content access protection and, more particularly, to providing content access protection with a common set of peer-to-peer interfaces.

BACKGROUND OF THE INVENTION

There have been many advances in consumer electronics devices. Consumer electronics devices may include devices such as cellular telephones, pagers, digital cameras, personal digital assistants (PDAs), remote controls, and the like.

In addition to becoming smaller, an increasing number of consumer electronic devices are network enabled and capable of accessing Web services through the Internet operated by the device vendor and/or third parties. With their ability to access the Internet directly, these consumer electronic devices will no longer rely on the traditional personal computer as intermediary device.

Once consumer electronics devices have their own network interfaces, in addition to communicating to other devices as a client from a client-server relationship, these interfaces can also be used for device-to-device, so-called peer-to-peer, communication.

Due to a variety of peer-to-peer protocols which can be customized for particular consumer electronics devices, there are challenges associated with offering applications which can be utilized by consumer electronic devices having different communications protocols.

SUMMARY OF THE INVENTION

The invention illustrates a system and method of sharing content with multiple peer device while protecting the content from unauthorized use. In one embodiment, the system and method comprises: identifying a plurality of peer devices within a predetermined area wherein each of the plurality of peer devices includes an interface framework; directly transmitting content among the plurality of devices; and a selected plurality of peer devices requesting a license from a digital rights management server for the content, wherein the selected plurality of peer devices possess the content, wherein the interface framework is configured to allow the plurality of peer devices to directly communicate and utilize an application Other aspects and advantages of the invention will become apparent from the following detailed description, taken in conjunction with the accompanying drawings, illustrated by way of example of the principles of the invention.

BRIEF DESCRIPTION OF THE DRAWINGS

The accompanying drawings, which are incorporated in and constitute a part of this specification, illustrate one embodiment of the invention and, together with the description, explain one embodiment of the invention. In the drawings.

FIG. 1B is a diagram illustrating an environment within which the invention may be implemented.

DETAILED DESCRIPTION

Figure 1A:
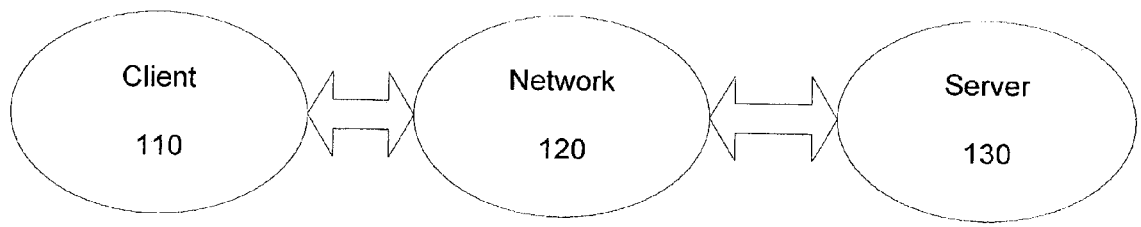
FIG. 1A is a diagram illustrating an environment within which the invention may be implemented.

The following detailed description of the invention refers to the accompanying drawings. The detailed description does not limit the invention. Instead, the scope of the invention is defined by the appended claims and equivalents.

The invention includes methods and apparatus for providing seamless and universal interfaces for consumer electronic devices. The invention also includes methods and apparatus for enabling a variety of different interfaces from various consumer electronic devices to communicate with each other. Through the invention, the consumer electronic devices may leverage the flexibility of peer-to-peer communication while still ensuring protection for digital content through unified digital rights management.

Direct communication from one device to another enables a variety of features such as instant messaging, content distribution, and special community features. Further, integration of digital rights management functions within each consumer electronics device prevents unauthorized use of protected content. In one embodiment, content distribution involves the distribution of content directly from one consumer to another consumer through a peer device while still retaining digital rights management functions. In one embodiment, special community features include features such as recommendations, collaborative filtering, and affinity matching.

In one embodiment, the invention streamlines the integration of peer-to-peer functionality into content-based services and applications by utilizing plug-ins. In one embodiment, the plug-in encapsulates an existing peer to peer protocol and expresses it via high-level interfaces that can be accessed by applications. For example, an existing peer-to-peer protocol may include a file sharing protocol or an instant messaging protocol.

In one embodiment, the plug-ins also insulate developers from specific peer to peer protocols. According to one embodiment of the invention, the interfaces are designed to be protocol-agnostic and allow developers to easily switch protocols, to build protocol bridges, or to build "multi-headed" clients while using a common interface core on the peer devices.

In one embodiment, the invention is capable of integrating multiple functionalities such as content, communication and community within a peer device.

With respect to content, peer-to-peer content distribution allows content to be obtained from peer devices in addition to central content servers. Peer to peer distribution may result in reduced costs to the service provider and also improved response for consumers. When coupled with communication and community, the ability to move content directly between peer devices gives the basis of the viral-like form of content distribution known as superdistribution and content distribution networking. The invention also integrates digital rights management functions which ensures that unauthorized use of protected content is prevented.

With respect to communication, instant messaging, voice over IP and other types of real-time communication may rely on peer-to-peer connectivity. Some instant messaging systems use proprietary protocols. In one embodiment, the invention provides multi-headed clients to bridge the different propriety instant messaging systems on a single peer device.

With respect to community, various features may tend to have interfaces which are proprietary and application specific. The various features include special interest groups, collaborative filtering (e.g., using group ratings to help find content), affinity matching (e.g., matching users based on preferences), playlist sharing, and sending and receiving recommendations.

In one embodiment, the invention supports proprietary or specialized interfaces to communicate with the various applications and/or services as well standardized interfaces to communicate with other peer devices.

Those skilled in the art will recognize that many other implementations are possible, consistent with the present invention.

A. Environment and Architecture

FIG. 1A is a diagram illustrating an environment within which the invention may be implemented. The environment includes a client 110, a network 120, and a server 130.

The client 110 may be a consumer electronics device. The consumer electronics device includes an interface framework which allows the unique interface protocol of the electronics device to seamless communicate with the server 130. Specifics of the interface framework are discussed below.

The network 120 interfaces with both the client 110 and the server 130. In one embodiment, the network 120 is the Internet. In another embodiment, the network 120 may be any transmission medium between the client 110 and the server 130.

The sever 130 is a device configured to interface with the client 110 through the network 120.

The client 110 and/or the server 130 may include a combination of software, hardware, and/or firmware to provide customized financing applications.

FIG. 1B is a diagram illustrating an environment within which the invention may be implemented. The environment includes a client 140, a network 150, and a client 160.

The clients 140 and 160 may each be a consumer electronics device. The consumer electronics device includes an interface framework which allows the clients 140 and 160 to seamlessly communicate with each other through a common set of protocols. Specifics of the interface framework are discussed below.

The network 150 interfaces with both the client 140 and the client 160. In one embodiment, the network 150 is the Internet. In another embodiment, the network 150 may be any transmission medium between the client 140 and the client 160.

The client 140 and/or the client 160 may include a combination of software, hardware, and/or firmware to provide the interface framework.

Figure 2:
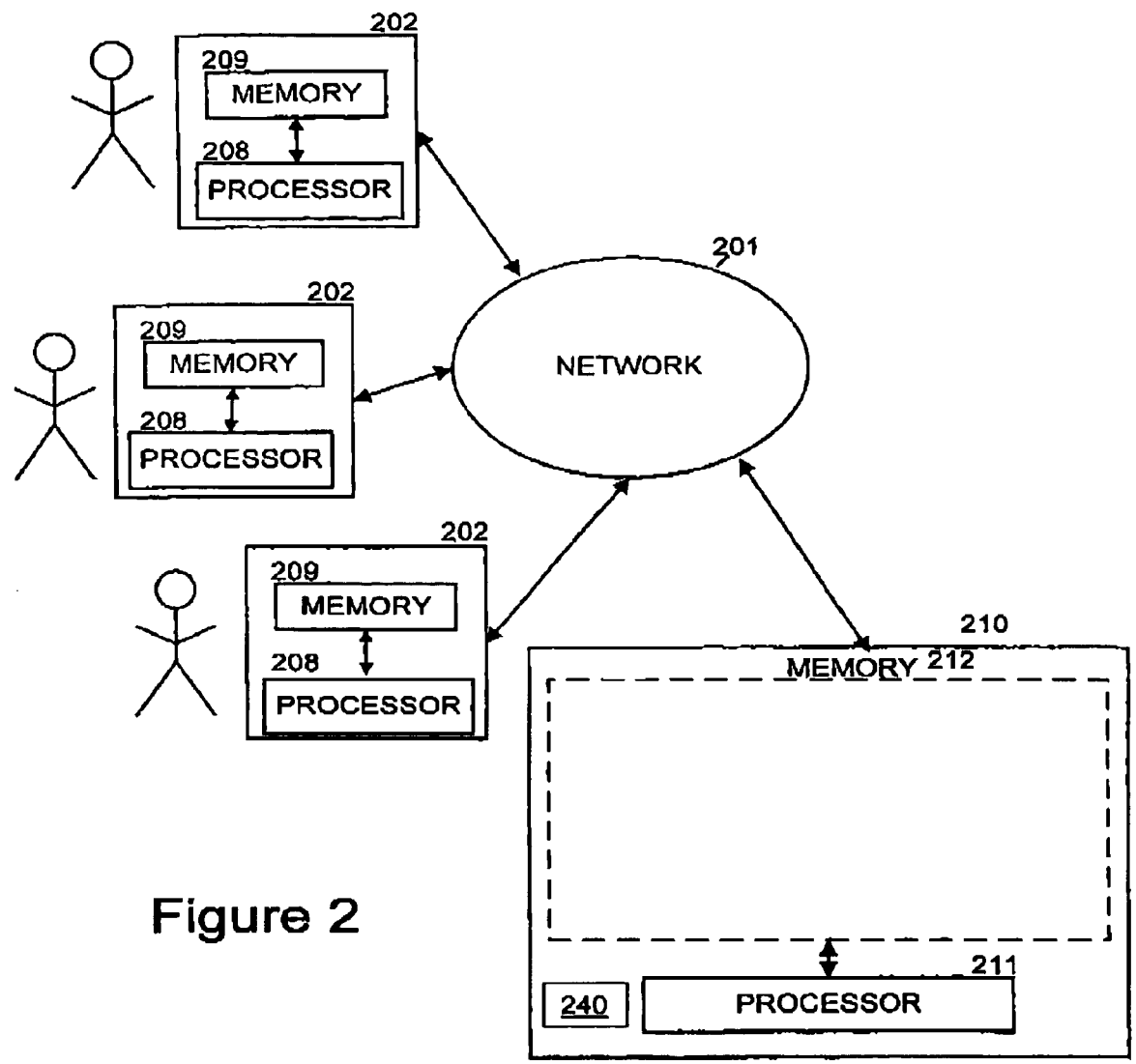
FIG. 2 is a simplified block diagram illustrating one embodiment in which the invention may be implemented.

FIG. 2 is a simplified diagram illustrating an exemplary architecture in which the present invention may be implemented. The exemplary architecture includes a plurality of client devices 202, a server device 210, and a network 201. In one embodiment, the network 201 may be the Internet. The plurality of client devices 202 are each configured to include a computer-readable medium 209, such as random access memory, coupled to a processor 208. Processor 208 executes program instructions stored in the computer-readable medium 209. In another embodiment, the plurality of client devices 202 may also include a number of additional external or internal devices, such as, without limitation, a mouse, a CD-ROM, a keyboard, and a display.

The interface framework may be stored on the plurality of client devices 202 within each computer-readable medium 209.

Similar to the plurality of client devices 202, the server device 210 may include a processor 211 coupled to a computer-readable medium 212. The server device 210 may also include a number of additional external or internal devices, such as, without limitation, a secondary storage element, such as database 240.

The interface framework may be stored on the server device 210 within each computer-readable medium 212.

The plurality of client processors 208 and the server processor 211 can be any of a number of well known computer processors, such as processors from Intel Corporation, of Santa Clara, Calif. In general, the plurality of client devices 202 may be any type of computing platform connected to a network and that interacts with application programs, such as a digital assistant or a "smart" cellular telephone or pager. The server 210, although depicted as a single computer system, may be implemented as a network of computer processors.

The plurality of client devices 202 and the server 210 may include the interface framework. In one embodiment, the plurality of computer-readable medium 209 and 212 may contain, in part, the interface framework. Additionally, the plurality of client devices 202 and the server 210 are configured to receive and transmit electronic messages for use with the interface framework. Similarly, the network 201 is configured to transmit electronic messages for use with the interface framework.

Figure 3:
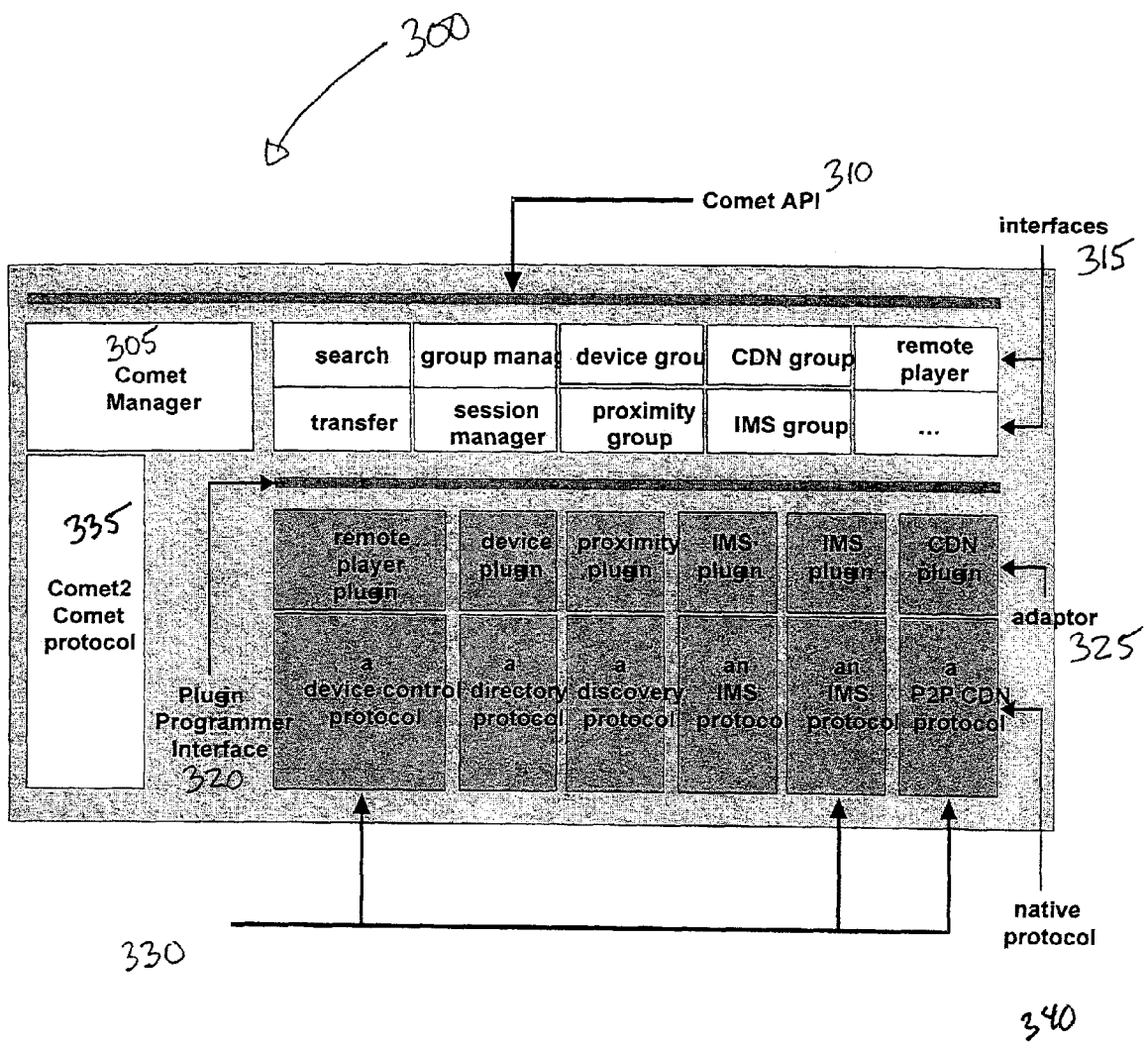
FIG. 3 is a simplified block diagram illustrating an interface framework, consistent with one embodiment of the invention.

FIG. 3 illustrates one embodiment of an interface framework 300. The interface framework 300 includes a manager 305, a framework application program interface 310, a plurality of interfaces 315, a plug-in programmer interface 320, a plurality of plug-ins 330, and a framework protocol 335.

In one embodiment, the manager 305 is configured to coordinate tasks, requests and communications between the framework application program interface 310, the plurality of interfaces 315, the plug-in programmer interface 320, the plurality of plug-ins 330, and the framework protocol 335.

In one embodiment, the manager 305 is configured to install, configure, and run the plurality of plug-ins 330. In one embodiment, the manager 305 also utilizes the framework protocol 335 to communicate with the interface framework 300 running on other devices. In one embodiment, the framework protocol 335 allows one device with the interface framework 300 to determine specific plug-ins which are installed on another device with the interface framework 300.

In one embodiment, the framework application program interface 310 is configured to communicate between the interface framework 300 and a device such as a consumer electronic device.

In one embodiment, the plurality of interfaces 315 are configured to be utilized by various applications for accessing the functionality of the plurality of plug-ins 330. In one embodiment, the plurality of interfaces 315 may include the functions of search, transfer, group manager, session manager, device group, proximity group, content distribution network group, instant messaging group, remote player, and the like.

In one embodiment, the plug-in programmer interface 320 is configured to communicate between the plurality of interfaces 315 and the plurality of plug-ins 330.

In one embodiment, each the plurality of plug-ins 330 implements a particular peer-to-peer protocol. For example, a plug-in may be configured to implement the distribution protocol such as the Napster protocol, or the Gnutella protocol in one embodiment. In another embodiment, a plug-in may be configured to implement a peer-to-peer content distribution network such as Gnutella and Napster.

In one embodiment, the plurality of plug-ins 330 includes a plurality of adaptors 325 and a plurality of native protocols 340. Each of the plurality of adaptors 325 is configured to integrate a corresponding one of the plurality of native protocols 340 into the interface framework 300.

In one embodiment, the plurality of adapters 325 include a remote player plug-in, a device plug-in, a proximity plug-in, an instant messaging plug-in, a content distribution network plug-in, and the like.

In one embodiment, the plurality of native protocols 340 is configured to correspond with an adaptor. For example, a device control protocol is an exemplary native protocol 340 which corresponds with the remote player plug-in. A directory protocol is an exemplary native protocol 340 which corresponds with the device plug-in. A discovery protocol is an exemplary native protocol 340 which corresponds with the proximity plug-in. An instant messaging protocol is an exemplary native protocol 340 which corresponds with the instant messaging plug-in. A peer-to-peer content distribution network protocol is an exemplary native protocol 340 which corresponds with the content distribution network plug-in.

In one embodiment, the plug-in programmer interface 320 is utilized to access both internal functionality and external functionality of the interface framework 300 to develop the plurality of adaptors 325.

In one embodiment, the plurality of plug-ins 330 provide functionality to applications outside the interface framework 300 via the plurality of interfaces 315. In one embodiment, the plurality of interfaces 315 are defined by the interface framework 300 and implemented by the plurality of plug-ins 330.

In one embodiment, the plurality of plug-ins 330 are configured to provide developers with a set of high-level application program interfaces. In one embodiment, developers are not concerned with the details of the underlying protocols and can easily add functionality to their applications by use of the plurality of plug-ins 330.

The specific plurality of interfaces 315, plurality of adaptors 325, plurality of native protocols 340 are shown for exemplary purposes and are not intended to limit the invention. Similarly, various elements are shown included within the interface framework 300 for exemplary purposes; additional elements may be added, elements may be deleted, and elements may be combined without departing from the scope of the invention.

Figure 4:
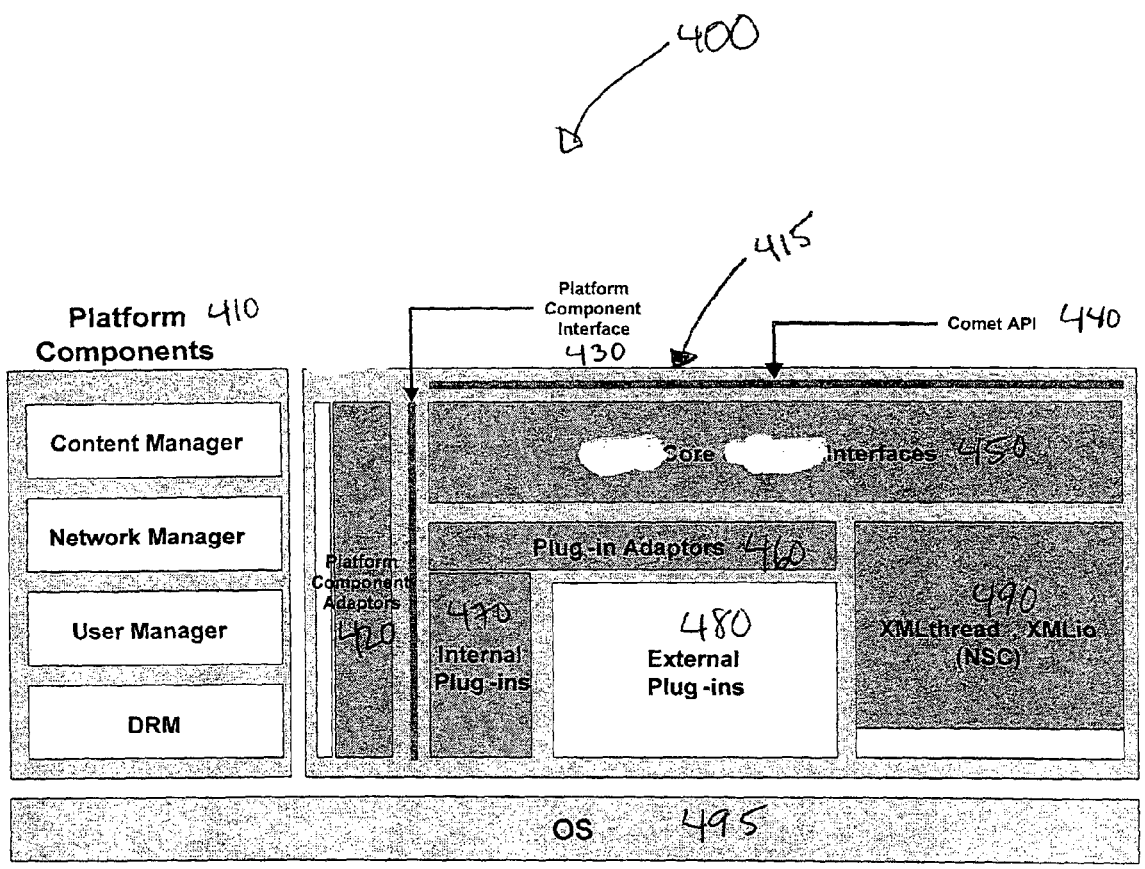
FIG. 4 is a simplified block diagram illustrating a system overview, consistent with one embodiment of the invention.

FIG. 4 illustrates one embodiment of a system 400. The system 400 includes platform components 410, an interface framework 415, and an operating system 495. The system 400 illustrates one embodiment of the interface framework 415 communicating with external components such as the platform components 410. In one embodiment, the platform components 410 may include a content manager, a network manager, a user manager, and a digital rights manager.

In one embodiment, the interface framework 415 includes a platform component adaptor 420, a platform component interface 430, an interface framework applications program interface 440, a core module 450, a plurality of plug-in adaptors 460, a plurality of internal plug-ins 470, a plurality of external plug-ins 480, and an XML module 490.

In one embodiment, the plurality of plug-ins 470 and 480 may need to access the platform components 410. To facilitate access to the platform components 410, the platform component interface 430 is utilized to encapsulate the components within the platform components 410.

In one embodiment, a portion of the platform component adaptor 420, the platform component interface 430, the interface framework applications program interface 440, the core module 450, the plurality of plug-in adaptors 460, the plurality of internal plug-ins 470, and a portion of the XML module 490 are platform independent. In one embodiment, portion of the platform component adaptor 420, the plurality of external plug-ins 480, and a portion of the XML module 490 are implemented for specific platforms. For example, the plurality of external plug-ins 480 are developed independently of the interface framework 415 and later integrated within the interface framework 415. In one embodiment, the plurality of internal plug-ins 470 are developed utilizing the tools within the interface framework 415.

In one embodiment, the platform component interface 430 increases the portability of the interface framework 415 by shielding the plurality of plug-ins 470 and 480 from changes to the platform components 410.

For example, the content manager within the platform components 410 which is utilized by a music jukebox application will likely differ from the content manager utilized by a video application. However in this example, both the music jukebox application and the video application may expose their unique content managers to one of the plurality of plug-ins 470 and 480 that would facilitate sharing the content from each respective content manager.

Figure 5:
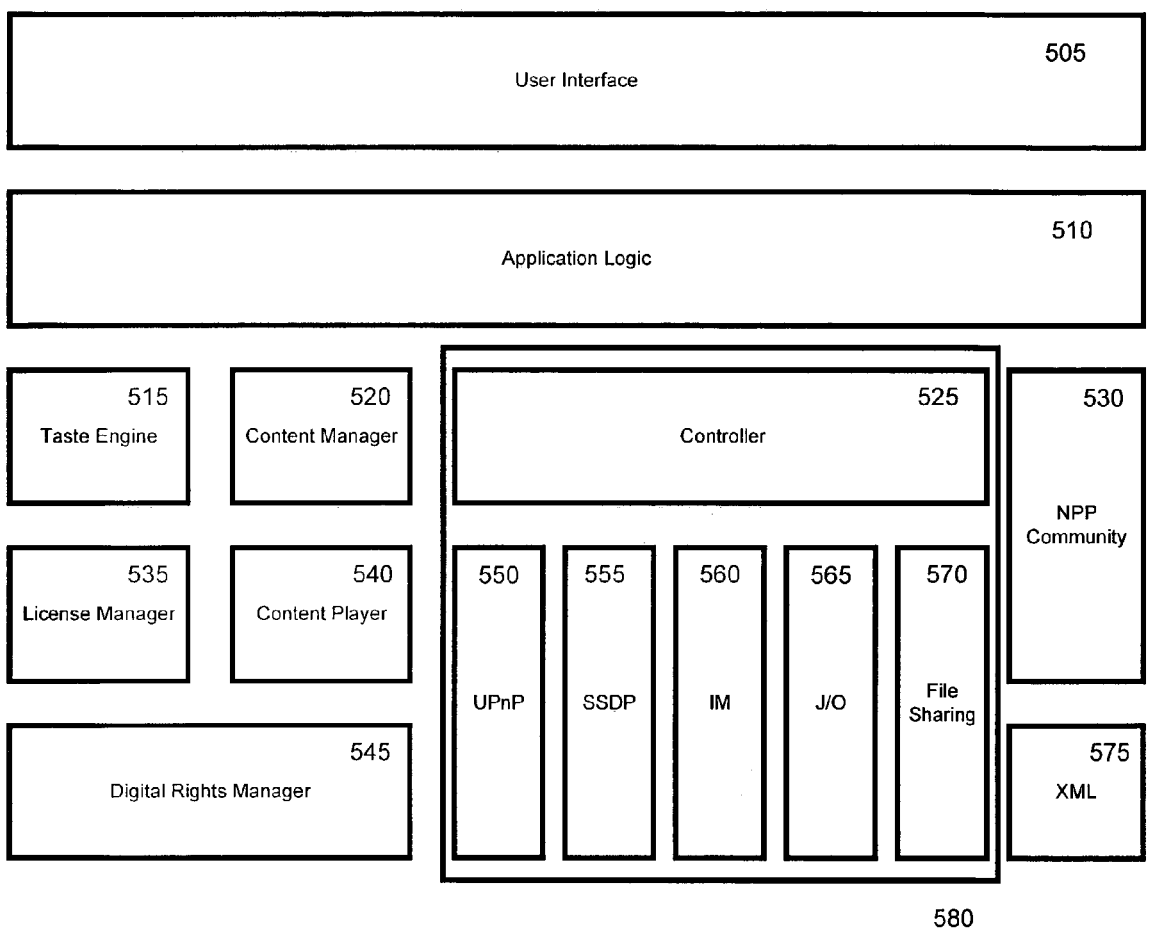
FIG. 5 is a simplified block diagram illustrating a system overview, consistent with one embodiment of the invention.

FIG. 5 illustrates one embodiment of a consumer electronics device 500. The electronics device 500 is a networked portable player in one embodiment. The networked portable player is configured to communicate with other networked portable players, exchange content with other networked portable players, store content, play content, and ensure authorized access to protected content.

The device 500 includes a user interface 505, application logic module 510, a taste engine 515, a content manager 520, a community module 530, a license manager 535, a content player 540, a digital rights manager 545, an XML module 575, and an interface framework 580.

In one embodiment, the user interface 505 is configured to accept input from a user of the device. Similarly, the user interface 505 is also configured to display information to the user.

In one embodiment, the application logic module 510 is configured to coordinate the functions of the taste engine 515, the content manager 520, the community module 530, the license manager 535, the content player 540, the digital rights manager 545, the XML module 575, and the interface framework 580. For example, the application logic module 510 coordinates authenticating a license by the license manager 535 for a particular content prior to playing the particular content on the content player 540.

In one embodiment, the taste engine 515 monitors a user's interaction with the device 500 and captures the content that the user accesses. The taste engine also builds a profile of the user based on the actions of the user and the content that is accessed.

In one embodiment, the content manager 520 is configured to track and catalog content within the device 500. The content manager 520 is also configured to interface with the digital rights manager 545 in one embodiment.

In one embodiment, the community module 530 tracks and polls other device within a predetermined range. In another embodiment, the community module 530 selectively tracks the status of predetermined devices such as on/off status, in/out of range status, and the like.

In one embodiment, the license manager 535 tracks and stores the licenses which are within the device 500.

In one embodiment, the content player 540 plays the content within the device 500.

In one embodiment, the digital rights manager 545 places restrictions on utilizing content that is not properly licensed. In one embodiment, the digital rights manager is OpenMG X. In other embodiments, other digital rights management system may be utilized.

In one embodiment, the XML module 575 is configured to communicate with a remote server. The XML module 575 utilizes XMLRPC. However, SOAP, http, or IP/TCP could be used in alternate embodiments. The interface framework 580 is similar to the interface framework 300 described in FIG. 3. The interface framework 580 may also include plug-ins related to universal plug and play (UPnP), Simple Session Discovery Protocol (SSDP), instant messaging, content distribution networks, and file sharing applications.

Figure 6:
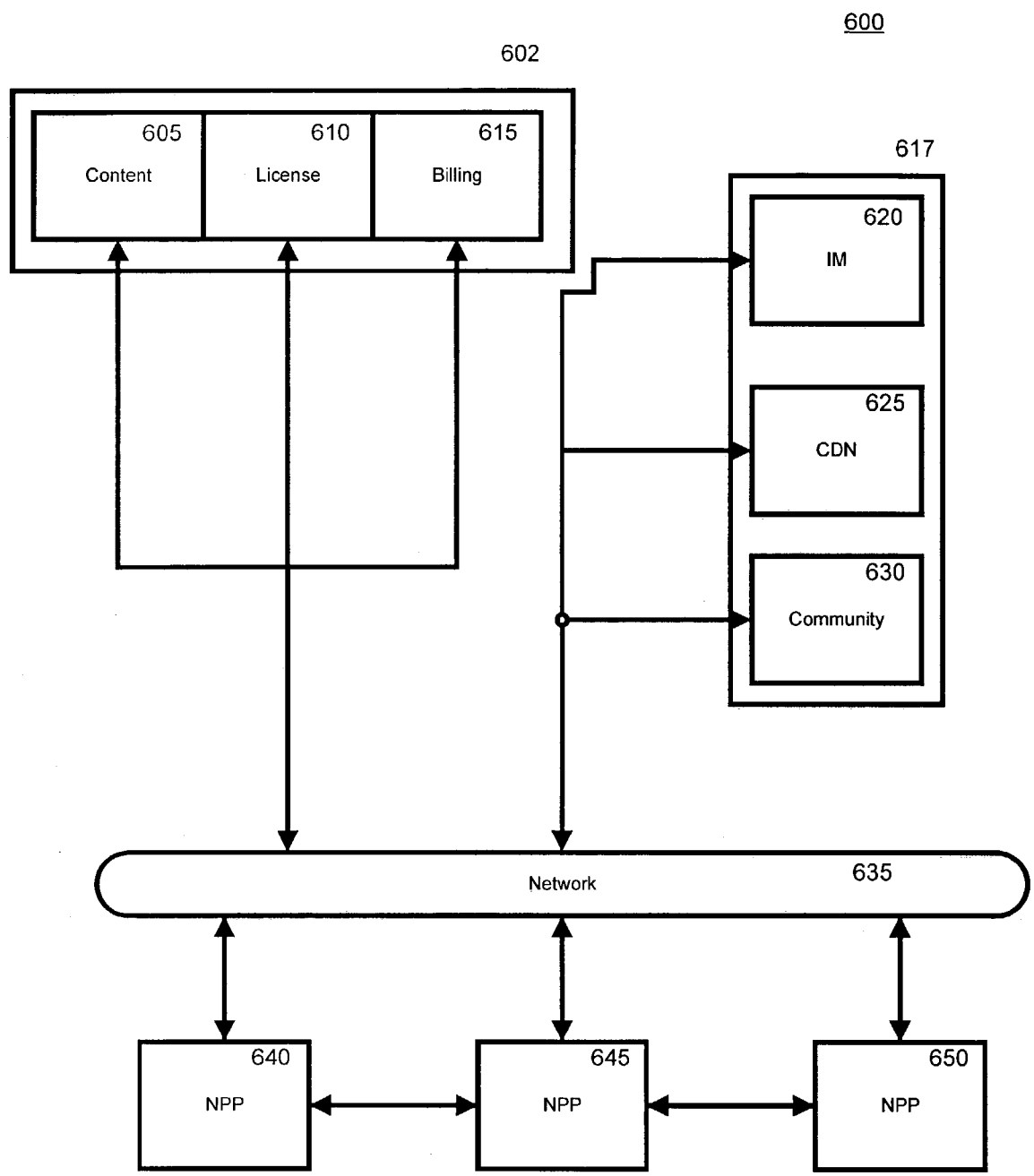
FIG. 6 is a system diagram consistent with one embodiment of the invention.

FIG. 6 illustrates a simplified block diagram showing a system 600. The system 600 includes a digital rights system 602, servers to mediate peer connectivity 617, a network 635, and a plurality of networked portable players 640, 645, and 650. In one embodiment, the digital rights system 602, the peer connectivity module 617, and the plurality of networked portable players 640, 645, and 650 are configured to communicate with each other via the network 635. The plurality of networked portable players 640, 645, and 650 are also configured to communicate directly with each other without utilizing the network 635.

In one embodiment, the digital rights system 602 includes a content server 605, a license server 610, and a billing server 615. The digital rights system 602 is configured to ensure that only authorized content is allowed to be played on one of the plurality of networked portable players 640, 645, and 650.

In one embodiment, the content server 605 tracks the location of protected content. In another embodiment, the content server 605 transmits content to one of the plurality of networked portable players 640, 645, and 650.

In one embodiment, the license server 610 tracks and authenticates the licenses that allow corresponding content to be played on one of the plurality of networked portable players 640, 645, and 650.

In one embodiment, the billing server 615 tracks payment for licenses for corresponding content. In another embodiment, the billing server 615 is also configured to message one of the plurality of networked portable players 640, 645, and 650 to request payment for a license.

The peer connectivity module 617 includes an instant messaging server 620, a content distribution network server 625, and a community server 630. In one embodiment, the instant messaging server 620 may utilize any known messaging application such as Yahoo Messenger™, MSN Messenger™, and the like. In one embodiment, the content distribution network server 625 may utilize commercial content distribution networks such as Napster. In one embodiment, there is no content distribution network server and content and the networked portable players support a server-less content distribution protocol such as Gnutella or FastTrack. Each of the plurality of networked portable players 640, 645, and 650 may be represented by the device 500 as shown in FIG. 5.

B. Operation

The flow diagrams as depicted in FIGS. 7, 8, 9, 10, and 11 illustrate merely one embodiment of the invention. The flow diagrams in FIGS. 7, 8, 9, 10, and 11 are one particular use of the invention based on a specific application. In other embodiments, the invention may be utilized with other applications. The blocks within the flow diagrams may be performed in a different sequence without departing from the spirit of the invention. Further, blocks may be deleted, added, or combined within each of the flow diagrams without departing from the spirit of the invention.

Figure 7:
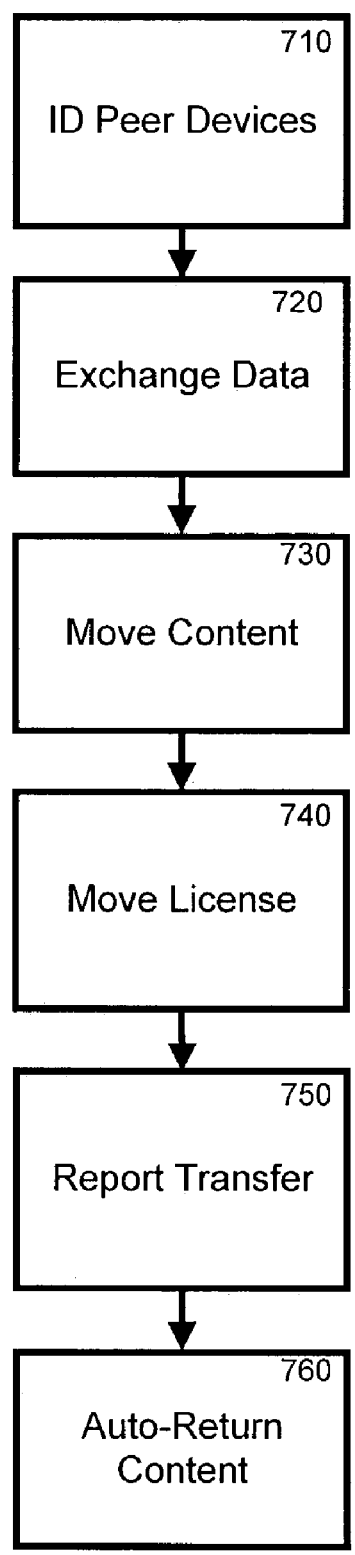
FIG. 7 illustrates a flow diagram for performing a peer-to-peer exchange according to one embodiment of the invention.

The flow diagram in FIG. 7 illustrates interactions with multiple devices utilizing the interface framework and a digital rights management server according to one embodiment.

In Block 710, peer devices that wish to interact are identified. In one embodiment, the interface framework within each device is initiated. In one embodiment, the peer device may be a networked portable player.

In one embodiment, a unique identification corresponding to each of the peer devices is confirmed. In one embodiment, each device has an identification such as a serial number which uniquely identifies a device.

In Block 720, the peer devices exchange data. In one embodiment, the peer devices exchange metadata with each other. The metadata may include content listing within each device, device identification, licensing information corresponding with the content, contact lists, instant messaging lists, and user profile information such as the sex of the user, age of the user, name of the user, location of the user, and interests of the user.

In Block 730, content is moved from a lender device to a borrower device. In one embodiment, the content is protected content such as music, movies, and the like. In one embodiment, the content is copied from the lender device to the borrower device, and the content is removed from the lender device. For example, without the content on the lender device, the lender device may not utilize the content.

In Block 740, a license is moved from the lender device to the borrower device. The license corresponds to the content moved from the lender device to the borrower device. In one embodiment, the license is copied from the lender device to the borrower device, and the license is removed from the lender device. For example, without the license on the lender device, the lender device may not utilize the content even if the content is currently within the lender device.

In Block 750, the transfer of the content and the license is reported to a digital rights management server. The information reported to the digital rights management may include the device identification of the borrower device and identification of the content.

The digital rights management server may bill the lender device and/or the borrower device. In one embodiment, a provisional license may be issued to the borrower device for a predetermined length of time, for a predetermined number of plays, or another restrictive measure.

In another embodiment, a full license may be issued to the borrower device with no restrictions. In one embodiment, if the content and license are transferred to the borrower device and sufficient payment is not made, the lender device is responsible for completing the payment. Otherwise, the content and corresponding license may be deactivated even for the lender device.

In one embodiment, a license is not need to preview content. For example, if a license is not issued, small sample sized portions of the content may be played for previewing the content.

In one embodiment, the transfer may be reported by the lender device. In another embodiment, the transfer may be reported by the borrower device.

In Block 760, an automatic return of the content may be performed. In one embodiment, the lender device, the borrower device, and/or the digital rights management server may store the transfer of the content from the lender device to the borrower device. By storing the transfer information of the content, the content along with the corresponding license may be returned to the lender device.

In one embodiment, the return of the content and corresponding license may occur automatically after a predetermined amount of time, a predetermined number of plays, and the like. The automatic return of the content and corresponding license also may occur if payment is not made to the digital rights management server.

In one embodiment, the lender device and the borrower device are located in proximity to each other such that direct transfer between the lender device and the borrower device are possible. In another embodiment, the lender device and the borrower device are on each other's contact list.

In another embodiment, the borrower device may transfer an additional content and corresponding license to the lender device. For example, in this embodiment, the borrower device and the lender device effectively both serve as a borrowing and lending party.

Figure 8:
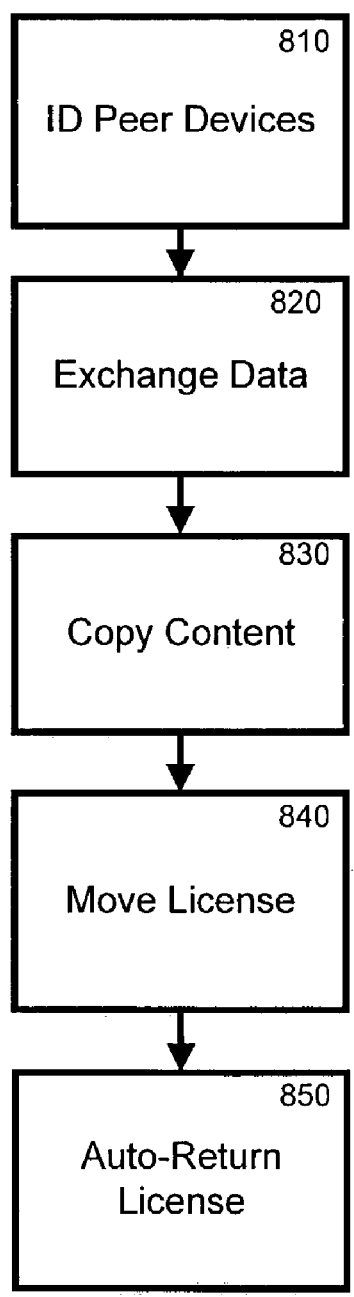
FIG. 8 illustrates a flow diagram for performing a peer-to-peer exchange according to one embodiment of the invention.

The flow diagram in FIG. 8 illustrates interactions with multiple devices utilizing the interface framework and a digital rights management server according to one embodiment.

In Block 810, peer devices that wish to interact are identified. In one embodiment, the interface framework within each device is initiated. In one embodiment, the peer device may be a networked portable player.

In one embodiment, a unique identification corresponding to each of the peer devices is confirmed. In one embodiment, each device has an identification such as a serial number which uniquely identifies a device.

In Block 820, the peer devices exchange data. In one embodiment, the peer devices exchange metadata with each other. The metadata may include content listing within each device, device identification, licensing information corresponding with the content, contact lists, instant messaging lists, and user profile information such as the sex of the user, age of the user, name of the user, location of the user, and interests of the user.

In Block 830, content is copied from an originating device to at least one receiving device. In one embodiment, the content is protected content such as music, movies, and the like. In one embodiment, there are multiple receiving devices.

In one embodiment, the content is copied from the originating device to the receiving device, and the content remains on the originating device.

In Block 840, a license is moved from the originating device to the receiving device. The license corresponds to the content copied from the originating device to the receiving device. In one embodiment, the license is copied from the originating device to the lending device, and the license is removed from the originating device. For example, without the license on the originating device, the originating device may not utilize the content even if the content is currently within the originating device.

In one embodiment, the license may be moved multiple times if there are multiple receiving devices.

In Block 850, an automatic return of the license may be performed. In one embodiment, the originating device and/or the receiving device(s) may store the transfer of the license from the originating device to the receiving device. By storing the transfer information of the license, the license may be returned to the originating device.

In one embodiment, the return of the license may occur automatically after a predetermined amount of time, a predetermined number of plays, and the like.

In one embodiment, the originating device and the receiving device(s) are located in proximity to each other such that direct transfer between the originating device and the receiving device(s) are possible. In another embodiment, the originating device and the receiving device(s) are on each other's contact list.

Figure 9:
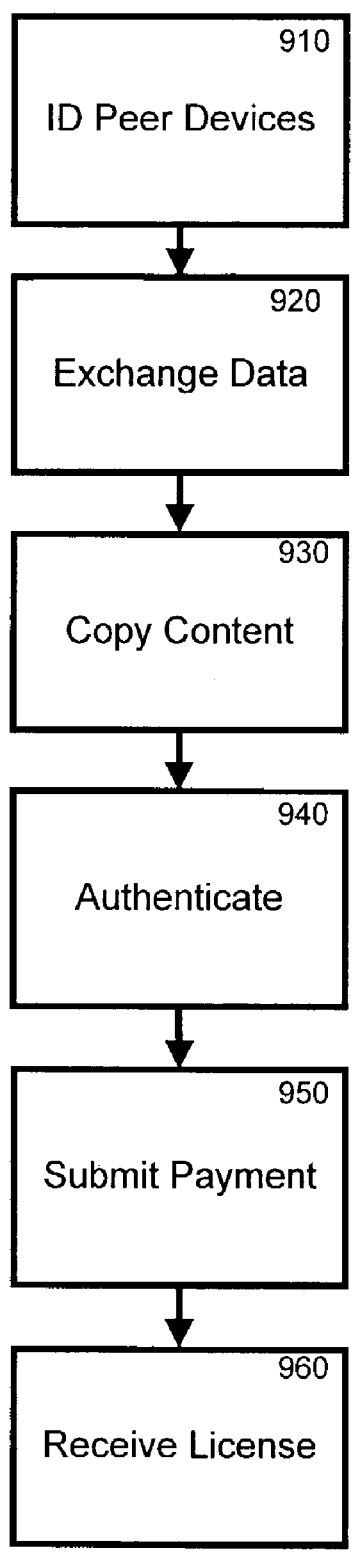
FIG. 9 illustrates a flow diagram for performing a peer-to-peer exchange according to one embodiment of the invention.

The flow diagram in FIG. 9 illustrates interactions with multiple devices utilizing the interface framework and a digital rights management server according to one embodiment.

In Block 910, peer devices that wish to interact are identified. In one embodiment, the interface framework within each device is initiated. In one embodiment, the peer device may be a networked portable player.

In one embodiment, a unique identification corresponding to each of the peer devices is confirmed. In one embodiment, each device has an identification such as a serial number which uniquely identifies a device.

In Block 920, the peer devices exchange data. In one embodiment, the peer devices exchange metadata with each other. The metadata may include content listing within each device, device identification, licensing information corresponding with the content, contact lists, instant messaging lists, and user profile information such as the sex of the user, age of the user, name of the user, location of the user, and interests of the user.

In Block 930, content is copied from a distribution device to a purchaser device. In one embodiment, the content is protected content such as music, movies, and the like.

In Block 940, the purchaser device is authenticated. In one embodiment, the purchaser device is authenticated through the device identification. In another embodiment, the user of the purchaser device is authenticated via a biometric parameter, a personal information number, a password and the like. The biometric parameter may include a finger print, an iris scan, or a DNA sample.

One reason for peer authentication is so that that the purchaser can provide a history of the license when the licensing/billing system is contacted by the purchaser. For example, the purchase can relay information relating to the content provider device, and the content provider device may receive a credit as an incentive for sharing the content.

The purchaser also is authenticated for the billing system when making a purchase. Accordingly, there may be two stages of authentication: 1) authentication of content provider device to the purchaser and 2) authentication of the purchaser to the billing system. In Block 950, the purchaser device submits a payment to a digital rights management server for a license to use the content. In one embodiment, the payment may be a micropayment.

In one embodiment, a license is not need to preview content. For example, if a license is not issued, small sample sized portions of the content may be played for previewing the content.

In Block 960, the license corresponding with the content is received by the purchaser device. The license may be a provisional license or a full license.

In one embodiment, the distribution device and the purchaser device are located in proximity to each other such that direct transfer between the distribution device and the purchaser device are possible. In another embodiment, the distribution device and the purchaser device are on each other's contact list.

Figure 10:
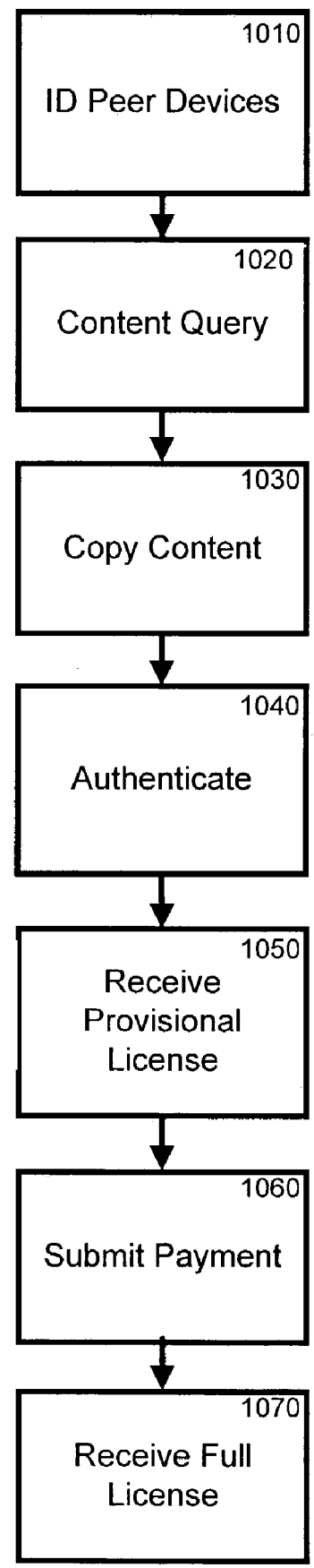
FIG. 10 illustrates a flow diagram for performing a peer-to-peer exchange according to one embodiment of the invention.

The flow diagram in FIG. 10 illustrates interactions with multiple devices utilizing the interface framework and a digital rights management server according to one embodiment.

In Block 1010, peer devices that wish to interact are identified. In one embodiment, the interface framework within each device is initiated. In one embodiment, the peer device may be a networked portable player.

In one embodiment, a unique identification corresponding to each of the peer devices is confirmed. In one embodiment, each device has an identification such as a serial number which uniquely identifies a device.

In Block 1020, the purchaser device initiates a content query. The content query may request the location and/or availability of specific content. In addition, the content query may be directed to another peer device such as a distribution device or to a remote server.

In Block 1030, content is copied from a distribution device to a purchaser device. In one embodiment, the content is protected content such as music, movies, and the like.

In Block 1040, the purchaser device is authenticated. In one embodiment, the purchaser device is authenticated through the device identification. In another embodiment, the user of the purchaser device is authenticated via a biometric parameter, a personal information number, a password and the like. The biometric parameter may include a finger print, an iris scan, or a DNA sample.

In Block 1050, the purchaser device receives a provisional license for the content. The provisional license may allow the use of the content by the purchaser for a predetermined length of time, for a predetermined number of plays, or a limited portion of the content may be available.

In Block 1060, the purchaser device submits a payment to a digital rights management server for a license to use the content. In one embodiment, the payment may be a micropayment.

In Block 1070, the license corresponding with the content is received by the purchaser device. The license may be a full license which allows unlimited use by the purchaser device.

In one embodiment, the distribution device and the purchaser device are located in proximity to each other such that direct transfer between the distribution device and the purchaser device are possible. In another embodiment, the distribution device and the purchaser device are on each other's contact list.

Figure 11:
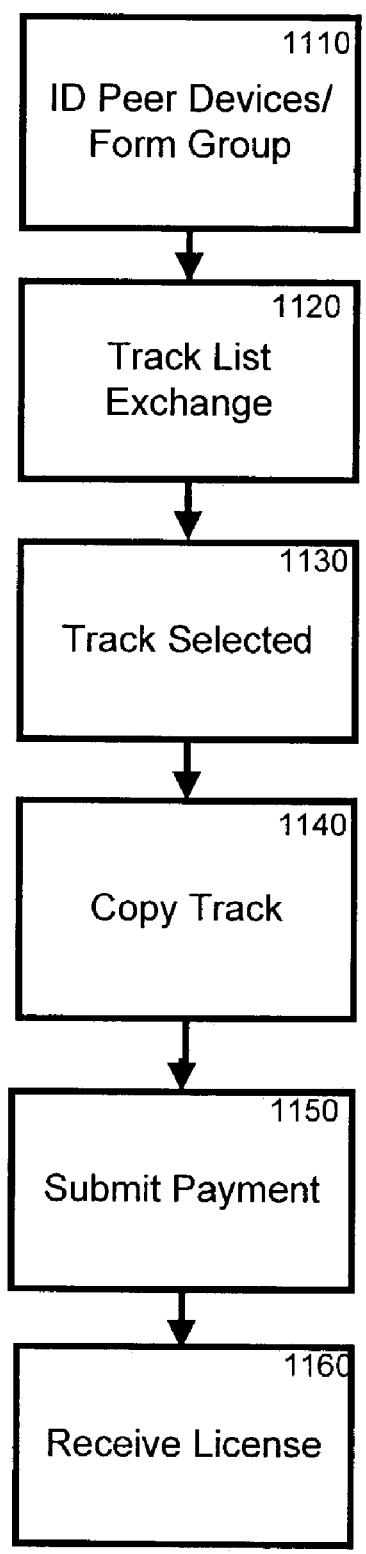
FIG. 11 illustrates a flow diagram for performing a peer-to-peer exchange according to one embodiment of the invention.

The flow diagram in FIG. 11 illustrates interactions with multiple devices utilizing the interface framework and a digital rights management server according to one embodiment.

In Block 1110, peer devices that wish to interact are identified. In one embodiment, the interface framework within each device is initiated. In one embodiment, the peer device may be a networked portable player.

In one embodiment, a unique identification corresponding to each of the peer devices is confirmed. In one embodiment, each device has an identification such as a serial number which uniquely identifies a device. The identified peer devices may form a peer group.

In Block 1120, a track list is exchanged among he peer devices within the peer group. In one embodiment, the track list is a listing of songs that are stored within the peer devices within the peer group.

In Block 1130, a track is identified from the track list by one of the devices within the peer group.

In Block 1140, the identified track is copied from an originating device to a receiving device. In one embodiment, the originating device may be one of a home stereo system, a computer, and the like. In one embodiment, the receiving device may be a networked portable player such as a personal digital assistant, an MP3 player, and the like. In one embodiment, the originating device and the receiving device communicate through a Bluetooth communication system or any other wireless protocol.

In Block 1150, the receiving device submits a payment to a digital rights management server for a license to use the selected track. In one embodiment, the payment may be a micropayment.

In one embodiment, a license is not need to preview content. For example, if a license is not issued, small sample sized portions of the selected track may be played for previewing the content.

In Block 1160, the license corresponding with the content is received by the purchaser device. The license may be a provisional license or a full license.

C. CONCLUSION

The foregoing descriptions of specific embodiments of the invention have been presented for purposes of illustration and description They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of sharing protected content between peer devices, comprising:
    detecting that a first and second peer device are sufficiently proximal to share content protected under digital rights management;
    determining if it is desirable for the first and second peer devices to interact;
    communicating a content query between the first and second peer device;
    copying or moving protected content between the first peer device as a lender and the second peer device as a borrower in response to said content query via a first interface framework;
    reporting the copying or moving of protected content between the first and second peer devices to a digital rights management server by the first peer device, second peer device, or a combination of the first and second peer device, within a license received for said protected content; and
    automatically returning, or deactivating, said license for said protected content to the lender in response to meeting time or use conditions, or if a payment is not made to the digital rights management server.

2. The method according to claim 1, wherein said content subject to said copying comprises:
    a provisional license in which content use by the borrower is limited as to time, number of accesses, or a combination of time and accesses; or
    a preview license in which sample portions of the content are made available for access by the borrower.

3. The method according to claim 1, wherein said protected content subject to said copying or moving comprises content whose associated license is removed from the lender and transferred to the borrower.

4. The method according to claim 1, wherein the first or second peer device is selected from the group of consumer electronics devices consisting of a networked portable player, cellular telephone, personal digital assistant, media player, pager, and personal computer.

5. The method according to claim 1, further comprising transmitting a payment from the second peer device to a digital rights management server through a second interface framework, in response to said copying or moving of said protected content for which the borrower purchases their own license.

6. The method according to claim 5, further comprising:
    transmitting a license to the second peer device from a digital rights management server through a second interface framework;
    wherein said protected content copied or moved from the first peer device can be utilized by the second peer device.

7. The method according to claim 1:
    wherein the first interface framework includes a plug-in for translating a command from an application; and
    wherein the plug-in comprises an adaptor and a native protocol.

8. The method according to claim 1, wherein said determining desirability of peer interaction comprises determining that the peer devices are on each others contact list.

9. The method according to claim 1, wherein the application is selected from the group of applications consisting of: an instant messaging application, a content distribution network application, a proximity application, and a digital rights management application.

10. The method according to claim 1, wherein said content query comprises a metadata sharing process.

11. The method according to claim 1, wherein said content which was moved to said borrower is also automatically returned to the lender in response to time or use conditions being met, or if a payment is not made to the digital rights management server.

12. The method according to claim 1, wherein said lender is responsible for completing a payment to a digital rights management server to prevent the license for said content which was moved or copied from being deactivated.

13. The method according to claim 1, wherein said content query comprises a metadata sharing process in which metadata is selected from the group of metadata consisting of content listings, tracks, device identification, licensing information, user profile, sex, age name, location, and interests which are shared between the first and second peer devices.

14. A system for extending protected content access between peers during peer-to-peer communications, comprising:
    a digital rights management application configured to receive and transmit a set of commands;
    a first peer device having an interface framework for translating a set of commands between the digital rights management application and the first peer device;
    wherein the first peer device is configured to directly communicate with a second peer device;
    a plug-in configured for communicating with the interface framework and an application program;
    wherein the plug-in is configured to translate requests from the application program into a peer device request that is understood by a peer device;
    wherein said system is configured for copying or moving protected content directly from said first peer device as lender to said second peer device as borrower if said second peer device is within a proximity of said first peer device that allows for direct transmitting; and
    programming executable within said digital rights management application for,
        receiving reports in response to the lending or transfer of protected content between said first and second peer devices, and
        deactivating or returning, automatically, the license for protected content which has been copied or moved from the first peer device to the second peer device if a payment is not made through said digital rights management application in response to said reports,
        wherein said protected content whose license is deactivated or returned does not comprise provisional or sample content which is subject to playback limitations.

15. The system according to claim 14, wherein said provisional or sample content comprises:
    a provisional license in which content use by the borrower is limited as to time, number of accesses, or a combination of time and accesses; or
    a preview license in which sample portions of the content are made available for access by the borrower.

16. The system according to claim 14 wherein the interface framework includes an adaptor for translating the set of commands for the first peer device.

17. The system according to claim 14 wherein said content query comprises a metadata sharing process.

18. The system according to claim 17 wherein said content query comprises a metadata sharing process in which metadata selected from the group of metadata consisting of content listings, tracks, device identification, licensing information, user profile, sex, age name, location, and interests which are shared between the first and second peer devices.

19. The system according to claim 14 wherein the second peer device is configured to receive a license from the application for utilizing the content.

20. The system according to claim 14 wherein the first or second peer device is selected from the group of consumer electronics devices consisting of a networked portable player, a cellular telephone, personal digital assistant, media player, pager, and personal computer.

21. The system according to claim 14, wherein said returning of the license comprises automatically returning the license from the borrower to the lender in response to time or use conditions being met, or if a payment is not made to the digital rights management application for said copying or moving of said protected content.

22. A method of sharing protected content between peer devices, comprising:
   identifying a plurality of peer devices within a predetermined area, wherein each of the plurality of peer devices includes an interface framework;
   wherein a selected plurality of peer devices are configured to request a license from a digital rights management server for content, wherein the selected plurality of peer devices possess the content; and
   wherein the interface framework is configured to allow the plurality of peer devices to directly communicate and utilize an application; and
   copying or moving protected content directly from a first of said peer devices as a lender to a second of said peer devices as a borrower if said second peer device is within a proximity of said first peer device that allows for direct transmitting;
   reporting the copying or moving of protected content between the first and second peer devices to the digital rights management server by the first peer device, or the second peer device, or a combination of the first and second peer device; and
   deactivating or returning, automatically, the license for protected content which has been copied or moved from the first peer device to the second peer device if a payment is not made through said digital rights management application in response to said reports;
   wherein said content whose license is deactivated or returned does not comprise provisional or sample content which is subject to playback limitations.

23. The method according to claim 22, wherein said provisional or sample content comprises:
   a provisional license in which content use by the borrower is limited as to time, number of accesses, or a combination of time and accesses; or
   a preview license in which sample portions of the content are made available for access by the borrower.

24. A computer-readable medium having computer executable instructions for performing a method of sharing protected content between peer devices, comprising:
   detecting that a first and second peer device are sufficiently proximal to share content protected under digital rights management;
   determining if it is desirable for the first and second peer devices to interact;
   communicating a content query between the first and second peer device;
   copying or moving protected content between the first peer device and the second peer device in response to said content query via a first interface framework;
   reporting the copying or moving of protected content between the first and second peer devices to a digital rights management server by the first peer device, second peer device, or a combination of the first and second peer device, within a license received for said protected content; and
   deactivating or returning, automatically, the license for protected content which has been copied or moved from the first peer device to the second peer device in response to said reports and restrictive measures as selected from the group of restrictive measures consisting of: time conditions, use conditions, and license payment conditions.

25. A system for extending protected content access between peers during peer-to-peer communications, comprising:
   means for detecting that a first and second peer device are sufficiently proximal to share content protected under digital rights management;
   means for communicating a content query between the first and second peer device;
   means for copying or moving protected content between the first peer device as a lender and the second peer device as a borrower in response to said content query via a first interface framework; and
   means for reporting the lending or transfer of protected content between the first and second peer devices to a digital rights management server by the first peer device, second peer device, or a combination of the first and second peer device, within a license received for said protected content; and
   means for deactivating or returning, automatically, the license for protected content which has been copied or moved from the first peer device to the second peer device in response to said reports and restrictive measures as selected from the group of restrictive measures consisting of: time conditions, use conditions, and license payment conditions.

* * * * *